(12) United States Patent
Jennings et al.

(10) Patent No.: US 6,425,015 B1
(45) Date of Patent: *Jul. 23, 2002

(54) STACKED COMMUNICATION DEVICES AND METHOD FOR PORT MIRRORING USING MODIFIED PROTOCOL

(75) Inventors: Kevin Jennings, Rathfarnham; Eugene O'Neil, Co. Dublin; Edele O'Malley, Ashtown; Raymond Beechinor, Catsleknock, all of (IE)

(73) Assignee: 3 Com Technologies, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 09/201,345

(22) Filed: Nov. 30, 1998

(30) Foreign Application Priority Data

Nov. 28, 1997 (GB) ............................................. 9725374

(51) Int. Cl.⁷ ............................................. G06F 15/17
(52) U.S. Cl. ........................ 709/238; 709/200; 370/400
(58) Field of Search ................................ 709/200, 238, 709/244; 341/102; 370/400–402

(56) References Cited

U.S. PATENT DOCUMENTS

| 5,327,127 | A | * | 7/1994 | May et al. .................. 341/102 |
| 5,483,522 | A | * | 1/1996 | Derby et al. ................ 370/400 |
| 5,610,905 | A | * | 3/1997 | Murthy et al. .............. 370/401 |
| 5,740,375 | A | * | 4/1998 | Dunne et al. ................ 709/238 |
| 6,175,875 | B1 | * | 1/2001 | Stapleton et al. ........... 709/250 |

FOREIGN PATENT DOCUMENTS

| WO | WO 95/03659 | 2/1995 |
| WO | WO 98/04066 | 1/1998 |

* cited by examiner

Primary Examiner—Zarni Maung
Assistant Examiner—Wen-Tai Lin
(74) Attorney, Agent, or Firm—McDonnell Boehnen Hulbert & Berghoff

(57) ABSTRACT

Port mirroring is achieved between ports on separate devices in a stack of communication devices by establishing a protocol for communications within a cascade connection forming the stack in which an indication is given of whether the communication is being sent to the mirror port in addition to its intended destination. This avoids increasing the volume of traffic in the cascade connection as would be the case if the original and mirror copy were sent separately.

13 Claims, 1 Drawing Sheet

STACKED COMMUNICATION DEVICES AND METHOD FOR PORT MIRRORING USING MODIFIED PROTOCOL

BACKGROUND OF THE INVENTION

1. Field of the Invention

The present invention relates to computer networks and in particular to communication devices by way of which computers are connected together to form such networks.

2. The Prior Art

It is well known to form computer networks comprising a number of computers connected together to enable them to communicate with each other. One well known way of connecting computers together is to provide communication devices having a plurality of ports, to each of which a computing device may be connected. The communication device provides for redistribution of communications received on its ports to the computing devices connected to the other ports.

One particular type of communications device is a repeater. A repeater simply retransmits any communication received on any port to each of its other ports thereby ensuring that each of the computing devices connected to the network receive all communications, enabling them to decide whether the communication is intended for them or not. Other types of communication devices include devices known as bridges which contain some processing capacity so that packets should only be retransmitted on ports necessary to enable those packets to reach their intended destinations. The present invention is applicable to all these types of communication devices but will be described basically in the context of bridges.

In a practical implementation a bridge is generally contained in an enclosure or box which also carries the external connections or ports to which the computing devices forming the network can be connected. For example there may be eight, sixteen or twenty-four ports provided on the device and the bridge is formed in a known manner on a circuit board also including the necessary management processing power to enable the bridge to function as intended.

More recently it has been recognised as desirable to enable the connection of two or more such devices together to increase the number of ports available at a particular location. This is commonly referred to as connecting the devices in a stack or cascade connection of the devices. Advantages of cascade connection of communication devices include the possibility of upgrading existing equipment to provide a greater number of ports without having to discard the existing equipment, and also the provision of more ports in a particular location than may be available on a standard piece of equipment.

Cascade connection between communication devices is typically achieved by providing a cascade or backbone link between the stacked devices. This connection may be made by way of one or two of the ports already provided on the devices for connection to computing devices in the network, alternatively there may be a separate port especially provided for the cascade link. It will be appreciated that, in the basic operation of a repeater, all communications received on any port by one of the devices in the stack will be repeated to the cascade connection in addition to the other ports thereby enabling it to be received by the other devices in the stack and repeated on out of the other ports on those devices. In a bridge arrangement, a received communication is transmitted via the cascade connection if this is necessary to enable the communication to reach its intended destination or destinations.

However, there are other functions which have been provided within a single communications device which present certain difficulties for implementation in a stack. One such feature which is useful to implement in a communication device is "port mirroring". This feature is designed to enable a network manager to monitor traffic passing through a specific port or ports in the network and this may be for any number of reasons, such as to monitor the volume of traffic on a particular port or to monitor the actual activities of a user of a particular port. Port mirroring is typically achieved by connecting a management unit to another port in the network. The communication device on which the port to be monitored is located is configured to send a copy of any communication passing through the port in question also to the management port so that the management device receives that copy.

In a stack of communication devices as discussed above, it may be desired that a management device connected to a port on one box in the stack should be able to monitor activity on a port on another box. In a conventional implementation of this feature, when that other box receives communications via the port in question it not only transmits that communication across the network via the cascade connection according to its normal operation, it additionally sends a copy of that communication to the management port via the cascade connection. This implementation therefore considerably increases the quantity of network traffic carried by the cascade connection which may possibly cause detrimental effect to the operating of the network and the stack in particular.

SUMMARY OF THE INVENTION

The present invention provides communications apparatus for a computer network in which a plurality of network devices are enabled to communicate with each other, the apparatus comprising:

a plurality of communication devices each having a plurality of ports via which network communications may be received and transmitted and a communication core means arranged to re-transmit network communications received at said ports according to a defined functionality; and interconnection means arranged to interconnect said communication devices such that network communications received at each communication device may be transmitted to the or each other communication device;

each said communication device comprising management means, said management means being arranged to have defined therein one or more relationship between a subset of said ports in which communications passing through one of said ports should be communicated to another of said ports, the management means being further arranged to transmit, together with each network communication transmitted to said interconnection means, an indication of whether said network communication has been received at a port on one of said communications devices which has a said relationship with a port in another one of said communication devices, and to read said indications received together with network communications received from said interconnection means.

The invention may be implemented to achieve the above discussed port mirroring function, but may also implement other features such as security features where communications at a particular port are to be diverted.

The present invention is therefore directed to enabling efficient implementation in a stack of communication devices of functions which have previously been implemented within a single communications device, such as those functions discussed above. To achieve this, the present invention uses a protocol of communications on the cascade connection different from that used in the network as a whole. In particular, communications packets sent via the cascade connection have one or more bits added to them, which extra bits convey information about the packet being transmitted from one communication device in the stack to another. On receipt of a communications packet via the cascade connection, a communication device acts on the information provided and will remove the extra bits before retransmission onto the rest of the network to ensure compliance with the overall network protocol.

In the context of port mirroring, the information provided according to the present invention indicates whether the packet in question is also to be transmitted to the management port and this removes the need to transmit the packet in question twice on the cascade.

BRIEF DESCRIPTION OF THE DRAWINGS

Other features and advantages of the present invention will be understood from the following description of an exemplary embodiment which is given in conjunction with the accompanying figures, in which.

DETAILED DESCRIPTION OF THE DRAWINGS

In this invention, port mirroring is achieved between ports on separate devices in a stack of communication devices by establishing a protocol for communications within a cascade connection forming the stack in which an indication is given of whether the communication is being sent to the mirror port in addition to its intended destination. This avoids increasing the volume of traffic in the cascade connection as would be the case if the original and mirror copy were sent separately.

Figure 1:
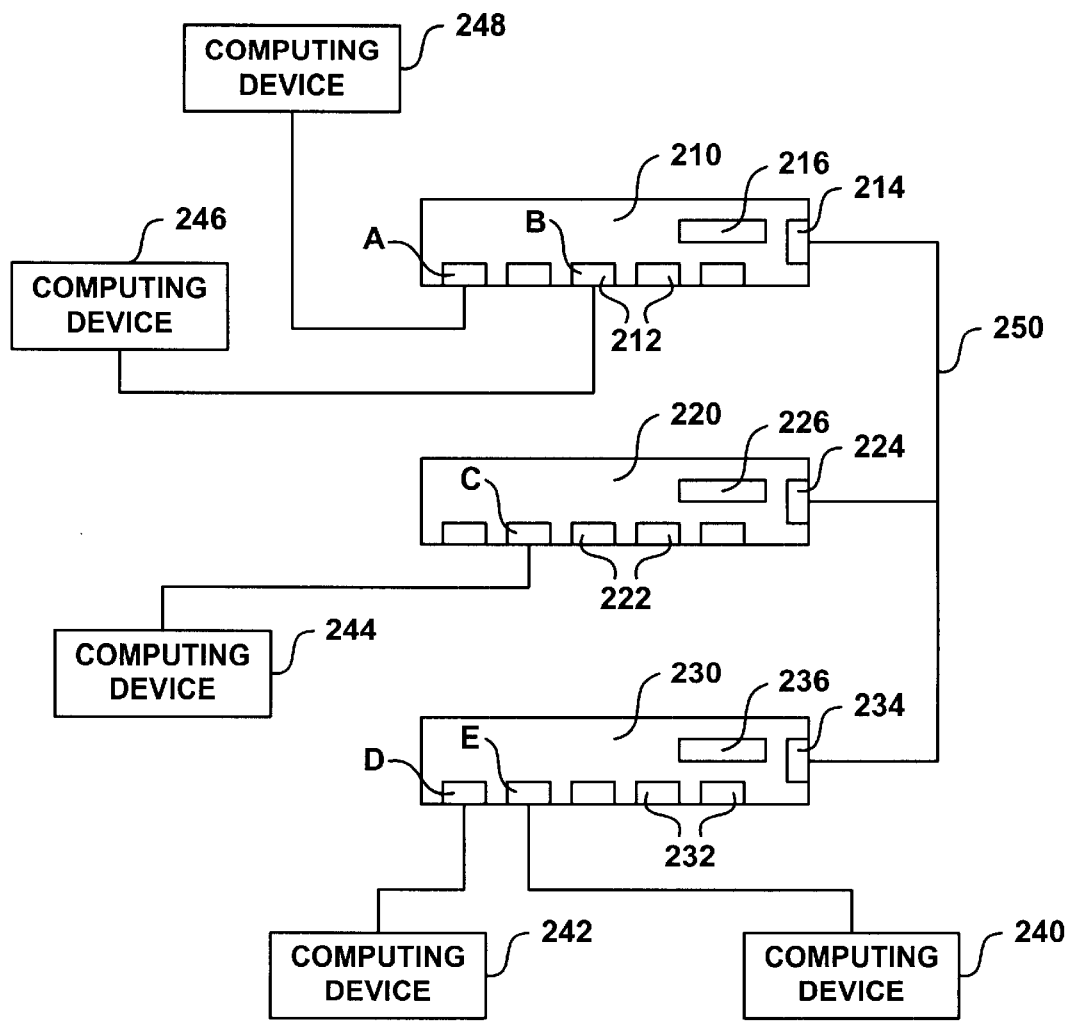
FIG. 1 is a schematic illustration of an embodiment of the present invention.

FIG. 1 illustrates, in schematic form, a simplified computer network useful for understanding the second embodiment of the present invention. Broadly, FIG. 1 illustrates three stacked communication devices 210, 220, 230 linked by cascade connection 250 and to which a number of computing devices are connected. In this embodiment these will be described as bridges, it being understood that the invention is also applicable to other types of communication devices such as switches as well as repeaters. In a practical network many more computing devices would be provided but only sufficient computing devices to understand this embodiment of the invention are illustrated in FIG. 1.

The communication devices 210, 220, 230 are provided with cascade ports 214, 224, 234 to which the cascade connection 250 is connected. The communication devices are also provided with device ports 212, 222, 232 to which the computing devices may be connected in the normal way. The communication devices are further provided with control means 216, 226, 236 which are connected to the ports and act to implement the basic functionality of the communication devices, in the present embodiment, the bridging function, and the scheme of the present invention as will be described below.

For ease of description, the ports to which the illustrated communicating devices are connected are designated A, B, C, D, E and it will be seen that computing devices 246, 248 are connected in the network via device 210, computing device 244 via device 220 and computing devices 240 and 242 are connected via device 230. In the specific arrangement which will be discussed in the following by way of an example, computing device 240 is acting as a monitoring device arranged to monitor the activity of computing device 248. That is, all communications sent by computing device 248 and therefore received at port A must be copied to port E in addition to reaching the intended destination. This function is implemented as described below by the control means. It will be seen also that the port to which the communications have to be copied is on a different box in the stack to the port which is being monitored. This means that the monitoring port E must receive its copies of the traffic of Port A via the cascade connection 250.

According to this invention, the control means in each communication device causes additional information to be sent with each communication packet which passes over the cascade connection 250 to enable appropriate action to be taken by the control means of other boxes in the stack. In the context of the present embodiment the additional information conveyed with a packet is information indicating whether that packet is to be copied to the monitoring port E in addition to being sent to its intended destination.

In the particular preferred implementation in the context of data packets, an additional data bit is added to the packet for transmission over the go cascade connection and this is known as the roving analysis port (RAP) bit. In principle, if this bit is set then the packet in question is one which needs to be sent additionally to the monitoring port otherwise it does not need to be sent to this port. The particular advantages of this as well as the manner in which the boxes in the stack react to the setting of the RAP bit will be explained in the following.

Figure 2A:
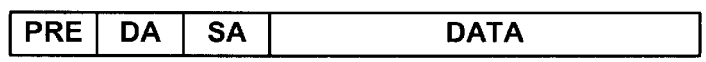
FIG. 2 illustrates the formation of a data packet in the preferred embodiment.

FIG. 2A illustrates the formation of a data packet in accordance with known network protocols such as Ethernet. The packet starts with a preamble (PRE) which carries no information but comprises a number of bits in a predetermined or pseudo random form enabling proper detection of and synchronisation with a packet which is being received. The packet also includes destination address (DA) and source address (SA) fields which identify the intended destination of the packet and its originator, and the data field which carries the actual data conveyed by the data packet. Various well known protocols define the presence of fields additional to those illustrated in FIG. 2A, but these are omitted here as FIG. 2A serves simply to illustrate the general format of a data packet. However it should be noted that within a network, all data packets must conform strictly to the pattern defined by the protocol under which the network is working to enable proper functioning of the network.

However, as mentioned above, in this invention additional data is added to each packet which is transmitted via the cascade link, and therefore effectively a local variation on the network protocol is established within the cascade connected stack.

Figure 2B:
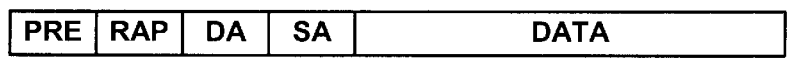

In particular, in the present embodiment an extra field (RAP) is added to each communications packet transmitted via the cascade as illustrated in FIG. 2B. This indicates if the packet in question is one which is to be sent additionally to the monitoring port. As illustrated the RAP field is inserted immediately ahead of the DA field. This is merely by way of example and the RAP field may be inserted at any appropriate position within the data packet. The insertion and removal of the RAP field is controlled by control means 216, 226, 236 which act to insert a RAP field in each packet transmitted via the cascade connection and to read and remove the RAP field from each packet received from the cascade connection. Packets being transmitted within the stack are therefore all of the form illustrated in FIG. 2B, but all packets transmitted to the network via ports 212, 222, 232 are of the form illustrated in FIG. 2A and therefore conform to the general network protocol.

In configuring the stack, control means 216 within box 210 and control means 236 within box 230 have defined therein the mirror function outlined above and all the control means are configured to insert and remove the RAP field upon transmission of packets to and reception of packets from the cascade connection. As mentioned above, the RAP field may simply be a single data bit, which may be sufficient if there is only one mirror defined in the stack. Alternatively the RAP field may comprise a plurality of bits. In the stack illustrated in FIG. 1 there is only one mirror and therefore it is sufficient to consider the RAP field to comprise only a single data bit. To facilitate understanding of this invention, the actions taken by the control means in the stack in various situations are described in the following.

Consider first the situation in which computing device 248 sends a communication packet intended for reception by computing device 246. On receipt of this communications packet via port A, control means 216 forms a single transmission sent both to the desired destination (via port B) and via the cascade 250. In the version of this transmission transmitted via port 214 to the cascade connection, the RAP bit is set. When the stacked devices receive communications via the cascade connection, the respective control means determines on the basis of the DA field whether the packet should be retransmitted via any of its ports in order to reach its intended destination or destinations. In the present example then, control means 226 and 236 both determine that the received packet does not need to be sent via any of ports 222 or 232 in order to reach the intended destination, device 246. However, control means 236 in box 230 is also responsive to the RAP bit, and in the present example, because the RAP bit is set it transmits the packet via port E enabling the copy of the communications packet in question to reach the management device 240.

If computing device 248 transmits a communications packet intended for computing device 244, control means 216 again forms a single transmission sent to box 220 and box 230 via the cascade connection. Once again, the RAP bit is set. Upon receipt by box 220 control means 226 determines that, according to the DA field, the packet should be retransmitted via port C, after removal of the RAP bit from the packet, enabling the communication to reach its intended destination, computing device 244. As box 220 does not have a copy port, the RAP bit is ignored. Once again, box 230 receives a communication with the RAP bit set and therefore transmits it via port E to management device 240.

In the event that computing device 248 is sending a communication packet intended for receipt by computing device 242, control means 216 again sends a transmission via the cascade connection 250. On receipt of this communication, control means 236 transmits the communication via port E as a result of the setting of the RAP bit to enable receipt of the communication by management device 240. Control means 236 also transmits the packet to its intended real destination determined by the DA field, that is via port D to computing device 242.

The provision of the extra field in the transmission of the packet via the cascade connection 250 means that it is only necessary to copy the communications packet to be sent to the management device 240 once via the cascade connection, and removes the need to have a whole additional communication via the cascade 250 for the mirroring function. This embodiment therefore considerably reduces the volume of traffic on the cascade connection 250 in a situation where, as described, a mirror port is on a different box in the stack from the port being monitored.

The above description simply uses the additional field to indicate that a cascade received packet should be sent to the mirror port. Additional indications may be given by the additional data inserted into the packets. In particular an additional "forward" bit may be set in the case where the actual intended destination of the data packet is associated with the same stacked device as the mirror port. Such an arrangement may remove the necessity for other stacked devices to receive the packets to be sent to the mirror port.

A related embodiment can also implement a security function. It is known in computer networks to define security ports to which communication packets received from unknown source addresses are redirected or copied. It will be appreciated that this and other functions similar to the mirror function discussed above can be implemented within a stack by the use of additional bits of fields in the data packets, with consequent efficient use of the cascade connection in a similar matter to that described above.

What is claimed is:

1. Communications apparatus for a computer network in which a plurality of network devices communicate with each other, said communications apparatus comprising:

a plurality of communication devices each having a plurality of ports by which network communications can be received and transmitted and a respective communication core for retransmitting network communications received at said ports according to a defined functionality; and a cascade connection interconnecting said communication devices whereby network communications received at each communication device can be transmitted to each other communication device in said plurality of communication devices; wherein each said communication device comprises a management means, said management means having defined therein a mirror relationship according to which network communications passing through a selected port of the respective communication device should be copied to another port; and wherein said management means transmits, together with each network communication transmitted to said cascade connection, an indication whether such network communication has been received at said selected port which has said mirror relationship with a port in another one of the communication devices in said plurality thereof and to read such indications received together with network communications received from said cascade connection.

2. Communications apparatus according to claim 1, for a computer network in which said network communications are in the form of data packets of a defined protocol; wherein said management means adds to each data packet transmitted by said cascade connection a data field constituting said indication and removes such a data field from data packets received from said cascade connection.

3. Communications apparatus according to claim 2, wherein said management means adds to data packets transmitted over the cascade connection a second indication, said second indication indicating that data packets are to be forwarded according to said defined protocol.

4. Communications apparatus according to claim 3, wherein said indication and said second indication are each one-bit fields.

5. Communications apparatus for a computer network at which a plurality of network devices communicate with each other by means of data packets conforming to an Ethernet protocol and each having a respective source address field and a respective destination address field, said communications apparatus comprising:

a plurality of communication devices each having a plurality of ports by which data packets can be received and transmitted and a respective communication core for re-transmitting data packets received at said ports according to a defined functionality, and a cascade connection interconnecting said communication devices whereby data packets received at each communication device can be transmitted to each other communication device in said plurality of communication devices; wherein at least one of the plurality of communication devices comprises a first management means, said first management means having defined therein a mirror relationship according to which data packets passing through a selected port of the at least one communication device are copied to a mirror port on another of the plurality of communication devices irrespective of destination address field; and wherein said first management means transmits to said cascade connection, together with each received data packet, an indication whether such data packet has been received at said selected port;

the communication device having the mirror port comprising a second management means to read said indications;

wherein data packets having said indications are copied to said mirror port.

6. Communications apparatus according to claim 5, wherein:

said first management means adds to each data packet transmitted by said cascade connection a data field constituting said indication, and wherein;

said second management means removes such a data field from data packets received from said cascade connection.

7. Communications apparatus according to claim 3, when said first management means adds to data packets transmitted over the cascade connection a second indication, said second indication indicating that data packets are to be forwarded according to said Ethernet protocol.

8. Communications apparatus according to claim 7 wherein said indication and said second indication are each one-bit fields.

9. Communications apparatus for a computer network in which a plurality of network devices communicate with each other, said communications apparatus comprising:

a plurality of communication devices each having a plurality of ports by which network communications can be received and transmitted and a respective communication core for re-transmitting network communications received at said ports according to a defined functionality; and a cascade connection interconnecting said communication devices whereby network communications received at each communication device can be transmitted to each other communication device in said plurality of communication devices; wherein at least one of the plurality of communication devices comprises a first management means, said first management means having defined therein a mirror relationship according to which network communications passing through a selected port of the at least one communication device are copied to a mirror port on another of the plurality of communication devices irrespective of destination address field; and wherein said first management means transmits, together with each received network communication to be transmitted via said cascade connection, am indication whether such network communication has been received at said selected port;

the communication device having said mirror port comprising a second management means to read said indications; and wherein said network communication is, in accordance with said indication, transmitted to said mirror port as well as to any other intended destination port of the network communication.

10. Communications apparatus according to claim 9, for a computer network in which said network communications are in the form of data packets of a defined protocol; wherein said first management means adds to each data packet to be transmitted via said cascade connection a first data field constituting said indication and a second data field indicating that data packets are to be forwarded according to said defined protocol, and wherein said second management means removes such first and second data fields from data packets received from said cascade connection; and wherein said network communication is selectively transmitted to said mirror port and said intended destination port in accordance with said data fields.

11. Communications apparatus according to claim 10, wherein said first and second data fields are each one-bit fields.

12. Communications apparatus for a computer network at which a plurality of network devices communicate with each other by means of data packets conforming to an Ethernet protocol and each having a respective source address field and a respective destination address field, said communications apparatus comprising:

a plurality of communication devices each having a plurality of ports by which data packets can be received and transmitted and a respective communication core for re-transmitting data packets received at said ports according to a defined functionality, and a cascade connection interconnecting said communication devices whereby data packets received at each communication device can be transmitted to each other communication device in said plurality of communication devices; wherein at least one of the plurality of communication devices comprises a first management means, said first management means having defined therein a mirror relationship according to which data packets passing through a selected port of the at least one communication device are copied to a minor port on another of the plurality of communication devices irrespective of destination address field; wherein said first management means adds to each received data packet to be transmitted via said cascade connection, an indication including a first field indicating whether such data packet has been received at said selected port, and a second field, said second field indicating that data packets are to be forwarded according to said Ethernet protocol;

the communication device having said mirror port comprising a second management means to read said indications; and wherein said network communication is transmitted selectively in accordance with said first and second fields to said mirror port and to a destination port in accordance with said destination address field.

13. Communications apparatus according to claim 12, wherein said first field and said second field are each one-bit fields.

* * * * *